UNITED STATES PATENT OFFICE.

WILLIAM TAYLOR, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

STORAGE-BATTERY SEPARATOR.

1,012,752.

Specification of Letters Patent.  Patented Dec. 26, 1911.

No Drawing.  Application filed July 8, 1911. Serial No. 637,532.

*To all whom it may concern:*

Be it known that I, WILLIAM TAYLOR, a citizen of the United States, residing at the city of Philadelphia, in the county of Philadelphia and State of Pennsylvania, have invented certain new and useful Improvements in Storage-Battery Separators, of which the following is a specification.

I have discovered in certain woods a quality common to them all or to them generally, as distinguished from other woods and materials, and such quality or characteristic adapts them peculiarly to storage battery separators. The woods possessed of the quality or characteristic that adapts them peculiarly to storage battery separators are known generally under the tribe name of *Taxodineæ*, and more specifically as genera *Taxodium* and *Sequoia* and still more specifically as species *Taxodium distichum* (American cypress) and *Sequoia sempervirens* (California red wood). The quality common to these woods that adapts them to storage battery separators includes the property of not swelling when wet and consequently when again dried of not shrinking, warping or twisting to an extent that unfits them for use as separators when dry or dried. Dry separators of this material can be used without the customary allowance for swelling when immersed in the electrolyte of the battery or other soaking solution. This quality also includes the property of these woods which is due to their density and which causes them to act as a diaphragm impervious to battery sediment, yet they are sufficiently porous for absorbing the electrolyte and permitting of the free passage of current; and this quality includes substantial freedom from deleterious organic matter such, for example, as acetic acid which injuriously attacks the positive pole plates; and this quality further includes sufficient mechanical strength and the property of resisting the destructive action of the electrolyte.

From the foregoing it is evident that the separators of this invention meet all the requirements of use in a storage battery and further that they can be dried even though they may have been previously treated with acid or alkaline solutions, or both, followed by washing in water, as is customary, in order to remove some of their ingredients which would attack lead or be otherwise deleterious.

The advantage of dry separators over those which have to be kept wet is obvious. The strength of the woods from which I make the separators is so great that even if the separators are treated in the manner above referred to they still retain ample mechanical strength for use in a storage battery. However, these woods contain so little deleterious matter such as would attack lead that they can be used without any treatment at all or with very little treatment.

For the sake of further explanation it may be said that the quality or characteristic which I have discovered in the certain woods to which reference has been made is that they can be soaked until they are flimsy and then dried again satisfactorily.

I do not claim in this application a storage battery separator consisting specifically of *Sequoia* and *Sequoia sempervirens* as that forms the subject-matter of my copending application verified of even date herewith and serially numbered 637,531, but

What I claim is:

1. A storage battery separator consisting of wood of the tribe name of *Taxodineæ*.
2. A storage battery separator consisting of wood of the genus *Taxodium*.
3. A storage battery separator consisting of wood of the species *Taxodium distichum*.
4. A storage battery separator consisting of dry wood of the tribe name of *Taxodineæ*.
5. A storage battery separator consisting of the dry wood of the genus *Taxodium*.
6. A storage battery separator consisting of the dry wood of the species *Taxodium distichum*.
7. A storage battery separator consisting of treated and dry wood of the tribe name of *Taxodineæ*.

8. A storage battery separator consisting of treated and dry wood of the genus *Taxodium*.

9. A storage battery separator consisting of treated and dry wood of the species *Taxodium distichum*.

In testimony whereof I have hereunto signed my name.

WILLIAM TAYLOR.

Witnesses:
BRUCE FORD,
GEO. M. HOWARD.